(No Model.)

G. P. SCHMUCKER.
DROP LIGHT PIPE FOR CHANDELIERS.

No. 258,135. Patented May 16, 1882.

WITNESSES:

INVENTOR,
Geo. P. Schmucker,
By Connolly Bros.,
ATTORNEYS.

United States Patent Office.

GEORGE P. SCHMUCKER, OF PHILADELPHIA, PENNSYLVANIA, ASSIGNOR TO W. J. BUCK, SON & CO., OF SAME PLACE.

DROP-LIGHT PIPE FOR CHANDELIERS.

SPECIFICATION forming part of Letters Patent No. 258,135, dated May 16, 1882.

Application filed January 18, 1882. (No model.)

*To all whom it may concern:*

Be it known that I, GEORGE P. SCHMUCKER, a citizen of the United States, residing at Philadelphia, in the county of Philadelphia and State of Pennsylvania, have invented certain new and useful Improvements in Drop-Light Pipes for Chandeliers; and I do hereby declare the following to be a full, clear, and exact description of the invention, reference being had to the accompanying drawings, which form part of this specification, and in which—

Figure 1:
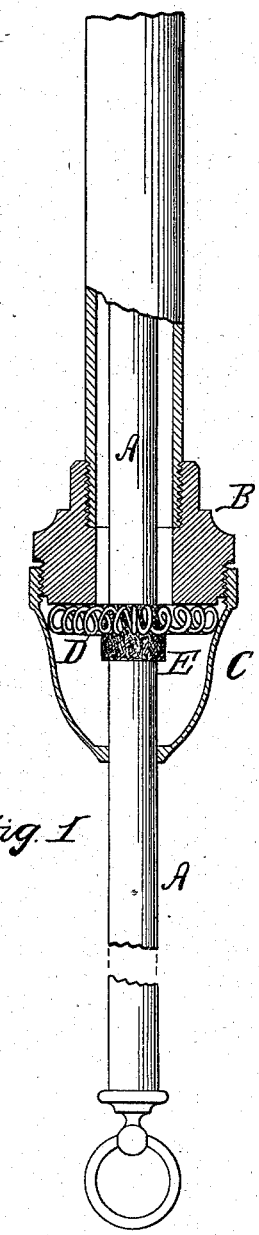
Figure 2:
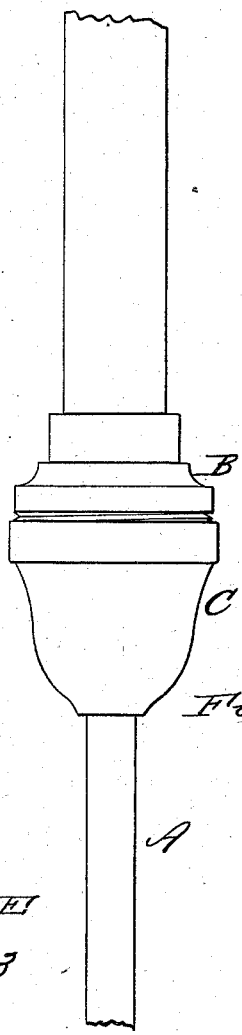
Figure 3:
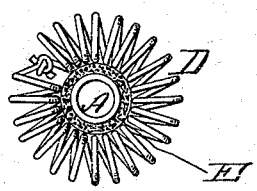

Figure 1 is a vertical section, partly in elevation, of my improvements. Fig. 2 is an elevation of the same, and Fig. 3 is a horizontal section.

My invention has for its object to provide a simple, inexpensive, and effective clamp for the drop-light pipes of chandeliers and other fixtures.

My invention consists essentially in a clamp composed of a spiral spring surrounding the drop-light pipe, and contained within a sectional box or shell, said spring being arranged with the axis of its coils transverse to the longitudinal axis of the pipe, and forming a collar on the pipe, as hereinafter fully set forth.

My invention still further consists in the combination, with the spiral-spring collar and the shell or box which holds the same, of a nut which forms a cap for said shell, and affords means for flattening or compressing the coils of the spring, so as to adjust the pressure of the same against the pipe which it encircles.

My invention still further consists in the combination, with a spiral-spring collar and sliding pipe encircled by the same, of a soft packing of fibrous or equivalent material interposed between said spring and pipe to prevent abrasion of the latter.

Referring to the accompanying drawings, A indicates a drop-light pipe, and C a box or shell through which it slides, said box being secured to a chandelier or other fixture, or forming an integral part of the same. Said box is provided with a threaded cap, B, which projects down into it, as shown.

D is a spiral spring, located in the shell C, resting, if desired, loosely therein. The longitudinal axis of said spring is horizontal, and consequently transverse to the vertical axis of the pipe A, its coils bearing against said pipe or against a soft packing, E, of fibrous or equivalent material interposed between said spring and pipe. The lower end of the nut or cap C bears against collar or spring D, and by turning said nut the coils of the spring may be flattened or compressed, thereby increasing the clamping pressure of said collar on the encircled pipe to any desired extent.

If desirable, an india-rubber ring may be substituted for the spiral spring D. When such ring is employed the packing E may be dispensed with.

What I claim as my invention is as follows:

1. A clamp for drop-light pipes, consisting of a spring collar or ring encircling said pipe, and located in a box or shell, with its longitudinal axis horizontal and transverse to the like axis of the sliding pipe, substantially as shown and described.

2. The combination, with sliding pipe A, of encircling spiral spring D, whose longitudinal axis is transverse to that of the pipe, and shell C, with threaded cap or nut B, adapted and designed to compress and flatten the coils of said spring, and thereby increase the pressure of the clamping-collar on the pipe, substantially as shown and described.

3. The combination, with sliding pipe A and encircling spiral spring D, having its longitudinal axis transverse to the like axis of said pipe, of the soft packing E, interposed between said spring and pipe to protect the latter from abrasion, as set forth.

In testimony that I claim the foregoing I have hereunto set my hand this 17th day of January, 1882.

GEORGE P. SCHMUCKER.

Witnesses:
ANDREW ZANE, Jr.,
S. J. VAN STAVOREN.